(12) United States Patent
Babala et al.

(10) Patent No.: US 6,434,456 B1
(45) Date of Patent: Aug. 13, 2002

(54) HIGH RELIABILITY PRESSURE SENSOR

(75) Inventors: Mike L. Babala, Plymouth; Marc Bolitho, Linden, both of MI (US); Thomas Baron, Leimbach (DE); Jeffery E. Shaya, Farmington Hills, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/749,305

(22) Filed: Dec. 27, 2000

Related U.S. Application Data

(60) Provisional application No. 60/230,841, filed on Sep. 7, 2000.

(51) Int. Cl.$^7$ .............................................. G06F 7/00
(52) U.S. Cl. ...................... 701/34; 180/197; 303/113.3; 303/113.4
(58) Field of Search ............................. 701/34; 303/10, 303/122.09, 113.5, 113.3, 113.4; 123/399; 180/197

(56) References Cited

U.S. PATENT DOCUMENTS

| | | | |
|---|---|---|---|
| 5,339,782 A | 8/1994 | Gölzer et al. | 123/399 |
| 5,427,442 A | 6/1995 | Heibel | 303/114.3 |
| 5,709,438 A | 1/1998 | Isakson et al. | 303/113.4 |
| 5,779,329 A | * 7/1998 | Sadao | 303/113.4 |
| 5,954,406 A | 9/1999 | Sawada | 303/122.09 |
| 6,122,577 A | 9/2000 | Mergenthaler et al. | 701/34 |
| 6,312,061 B1 | * 11/2001 | Schliebe et al. | 303/20 |

* cited by examiner

*Primary Examiner*—William A. Cuchlinski, Jr.
*Assistant Examiner*—Marthe Y. Marc-Coleman
(74) *Attorney, Agent, or Firm*—MacMillan, Sobanski & Todd, LLC

(57) ABSTRACT

The reliability of a pressure sensor is improved either by utilization of redundant components. A pair of pressure sensors are mounted upon a single pressure sensor diaphragm. The pressure signals generated by the pressure sensors are compared and, if the difference between the signals exceeds a predetermined threshold, it is determined that a malfunction of the pressure sensor has occurred. Alternately, additional diagnostic testing may be included to detect a malfunctioning sensor.

24 Claims, 6 Drawing Sheets

HIGH RELIABILITY PRESSURE SENSOR

CROSS REFERENCE TO RELATED APPLICATION

This application claims the benefit of U.S. Provisional Application No. 60/230,841, filed Sep. 7, 2000.

BACKGROUND OF THE INVENTION

This invention relates in general to pressure sensors used in hydraulic control systems and in particular to a high reliability pressure sensor utilized in a vehicle brake system with Hydraulic Brake Assist.

Recently, Hydraulic Brake Assist (HBA) has been included on new vehicles. HBA provides maximum braking capability during an emergency braking situation. During a braking cycle, the brake pressure is sensed to determine if an emergency situation has occurred. Alternately, the magnitude of the brake pedal stroke and speed of brake pedal movement can be monitored for an emergency braking situation. Typically, an emergency is identified by a certain pedal-application speed occurring along with a minimum level of brake-pedal force. Thus, a quick, deep stab at the brake pedal actives HBA while a quick shallow stab, as to cancel cruise control, or a slow but deep pedal application, as when slowing for a curve, will not active HBA.

Upon detection of an emergency braking situation, HBA increases brake application pressure to a maximum value and continues to hold the maximum pressure until the vehicle stops or the brake pedal is released, as illustrated in FIG. 1. In FIG. 1, vehicle braking force is plotted as a function of time. The lower curve, which is labeled 4, is for a brake system without HBA, while the upper curve, which is labeled 6, is for a brake system that includes HBA. Typically, during an emergency braking situation, the vehicle operator partially lifts his foot from the brake pedal following his initial quick, deep stab. Thus, HBA assures that the brakes remain applied with maximum force.

There are a number of know methods for integrating HBA with a vehicle brake system. One method is completely mechanical and involves modification of the vacuum brake booster to provide HBA. Another method is to include the HBA function in an Anti-lock Brake System (ABS). An ABS is often included in many vehicles to prevent wheel lock up during stops upon low mu road surfaces. Such systems detect excessive slippage of one or more controlled wheels and selectively reduce and reapply the pressure applied to the controlled wheel brakes to reduce the slippage and thereby avoid a potential locking-up of the wheel.

Referring again to the drawings, there is illustrated in FIG. 2, a typical brake control system 10 which has HBA included in an Anti-lock Brake System (ABS). The brake control system 10 is intended to be exemplary and it will be appreciated that there are other brake control systems having different architecture than shown. In FIG. 2, a brake pedal 12 is mechanically coupled (not shown) to a brake light switch 13 and a dual reservoir master cylinder 14. The master cylinder 14 is connected to a hydraulic control unit 16 by a pair of hydraulic lines 18 and 20. The hydraulic control unit 16 includes a plurality of solenoid valves to control the brake pressure applied to the individual wheel brakes. The control unit 16 also typically includes a source of pressurized hydraulic fluid, such as a pump driven by an electric motor. The control unit 16 is connected via hydraulic lines 22, 24, 26 and 27 to individual wheel brakes (not shown) for the front wheels 28 and 30 and the rear wheels 32 and 33. Typically, the brake circuit is diagonally split with one master cylinder reservoir controlling the brakes associated with the left front wheel 30 and right rear wheel 33 and the other master cylinder reservoir controlling the brakes associated with the right front wheel 28 and the left rear wheel 32.

The brake control system 10 also includes a pair of front wheel speed sensors 34 that generate signals that are proportional to the speed of the front wheels 28 and 30 and a pair of rear wheel speed sensors 36 that generate signals that are proportional to the speed of the rear wheels 32 and 33. The wheel speed sensors 34 and 36 and the stop light switch 13 are electrically connected to an Electronic Control Unit (ECU) 38. The control unit 38 includes a microprocessor (not shown), that, under the control of an algorithm, selectively actuates the solenoid valves and pump in the control unit 16 to correct excessive wheel slippage.

The brake control system 10 further includes a pressure sensor 40 that monitors the hydraulic pressure in one of the master cylinder reservoirs. An pressure signal is supplied to the ECU 38. The microprocessor monitors the pressure signal and responsive thereto, upon detecting an emergency brake application, to actuate HBA.

A typical prior art pressure sensor assembly is illustrated generally at 44 in FIG. 3. The pressure sensor assembly includes a sensor element 46 that is electrically coupled to an Application Specific Integrated Circuit (ASIC) 47. Hydraulic pressure is applied to the sensor element 46. Both the sensor element 46 and the ASIC 47 are typically mounted in a common housing, that is shown schematically by the dashed line labeled 48 in FIG. 3. The sensor element 46 may include a plurality of strain gauges mounted upon one side of a thin diaphragm. The diaphragm is usually a disc formed from stainless steel. The strain gauges are typically arranged as a conventional half or full bridge circuit, such as, for example, a conventional thin film Wheatstone Bridge. The hydraulic brake fluid in the brake system is in contact with the side of the diaphragm opposite from the strain gauges. When the vehicle brakes are applied, the hydraulic brake fluid is pressurized and causes the diaphragm to deflect from its rest position. As the diaphragm is deflected by the applied pressure, the strain gauges are stretched or compressed, causing a change in the internal resistance of the gauges. The changed resistances result in a voltage appearing across the bridge circuit that is proportional to the magnitude of the pressure. The voltage is conditioned by the ASIC 47. The ASIC 47 generates an analog or digital pressure signal that is applied to an input port of an ECU microprocessor 49. The microprocessor 49 is included in the vehicle brake control system 10.

SUMMARY OF THE INVENTION

This invention relates to a high reliability pressure sensor utilized in a vehicle brake system with Hydraulic Brake Assist.

As explained above, current HBA systems include a pressure sensor to detect an emergency stop condition. However, if the pressure sensor should malfunction or fail, it is possible that a false emergency stop signal may be generated that would trigger the HBA. It is known to improve HBA system reliability by including a second complete pressure sensor to provide a redundant pressure signal to the ECU microprocessor. The ECU microprocessor compares the two signals and, if the signals are different, it is assumed that one of the pressure sensors is malfunctioning and the HBA is disabled. However, the inclusion of two complete pressure sensors is both bulky and expensive. Two pressure sensors also require two ports in the hydraulic control unit which increases the potential for hydraulic fluid leakage. Accordingly, it would be desirable to improve the reliability of the measurement of the brake pressure in a HBA system without requiring two separate pressure sensors.

The present invention contemplates a pressure sensor assembly for a hydraulic control unit that includes a pressure sensor housing adapted to be mounted upon a hydraulic control unit and a pressure sensor diaphragm carried by the housing. First and second pressure sensing elements are mounted upon the pressure sensor diaphragm. A first signal conditioning circuit is connected to the first pressure sensing element and a second signal conditioning circuit is connected to the second pressure sensing element The said first and second signal conditioning circuits are operable to generate first and second pressure signals at output ports. An active electronic device is connected to the output ports of the first and second signal conditioning circuits and is operative to compare the first and second pressure signals. In the preferred embodiment, the active electronic device includes a microprocessor; however, other devices, such as, for example, a comparator circuit also can be used. Upon detecting a difference between the pressure signals the electronic device generates an error signal. The error signal can be generated when the difference between the pressure signals is non-zero or when the difference exceeds a predetermined threshold. In the preferred embodiment, the pressure sensor assembly is included in a hydraulic brake assist system and the electronic device is further operable to disable the hydraulic brake assist system upon generating the error signal. The first and second signal conditioning circuits can be separate electronic components or can be included in a single electronic component.

Alternately, the two pressure sensing elements can be connected to a single signal conditioning circuit. The signal conditioning circuit is operable to generate a digital pressure signal which includes pressure data from both of the pressure sensing elements. In the preferred embodiment, the digital pressure signal is time multiplexed. Additionally, the pressure sensor assembly can include a temperature sensor with the digital signal generated by the signal conditioning circuit including temperature data.

It is further contemplated that the pressure sensor assembly includes a single pressure sensing element connected to a signal conditioning circuit. The signal conditioning circuit being operative to generate a pressure signal. The signal conditioning circuit also includes at least one diagnostic test and is operable to generate an error signal upon detecting a predetermined fault condition. Furthermore, the associated active electronic device also can include at least one diagnostic test and be operative to generate an error signal upon detection of a predetermined fault condition. Additionally, the active electronic device can be adapted to receive operating data from at least one vehicle component and to include the vehicle parameter data in the diagnostic test.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
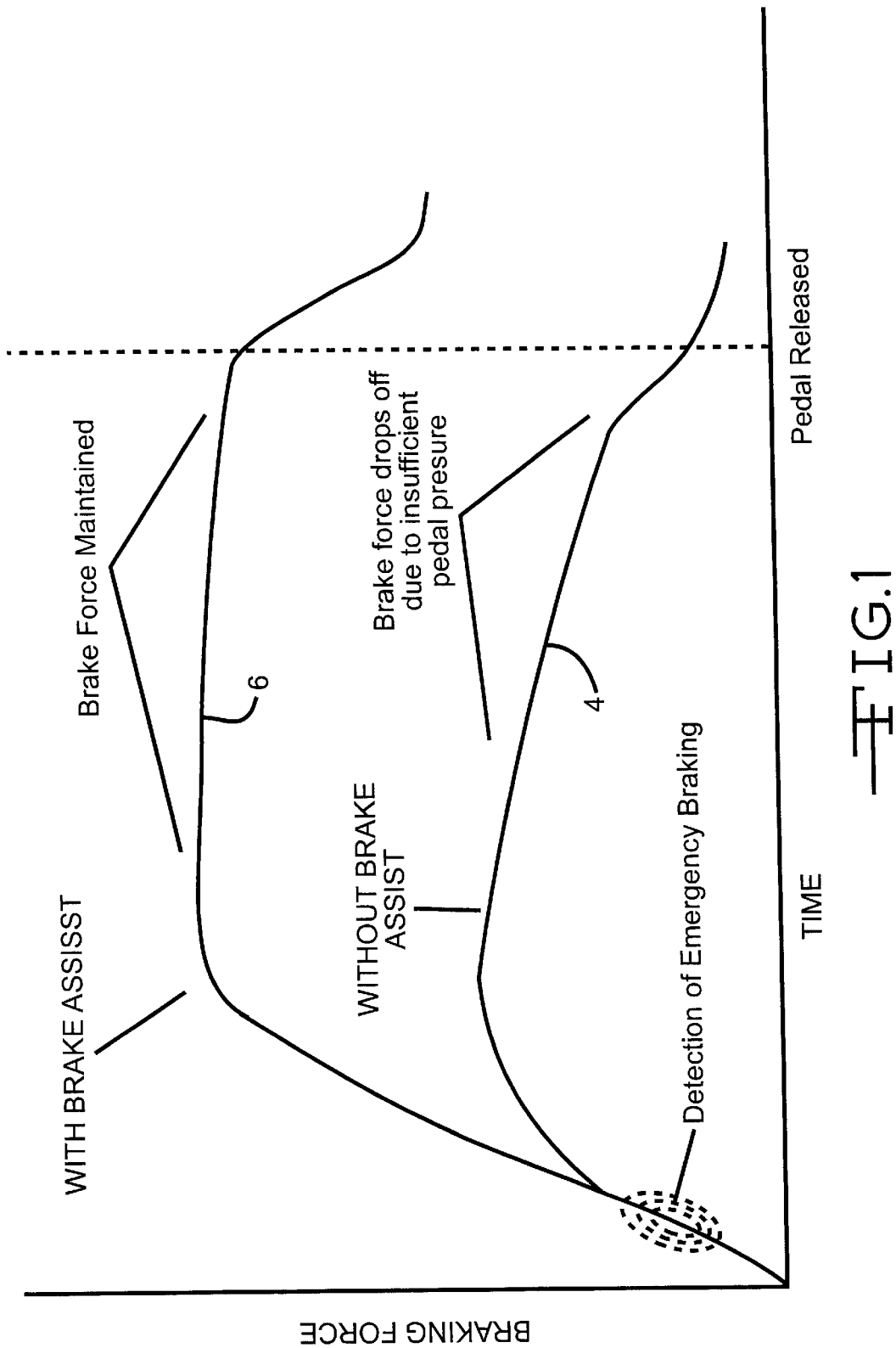
FIG. 1 is a plot of braking force vs. time that illustrates the operation of Hydraulic Brake Assist.
Figure 2:
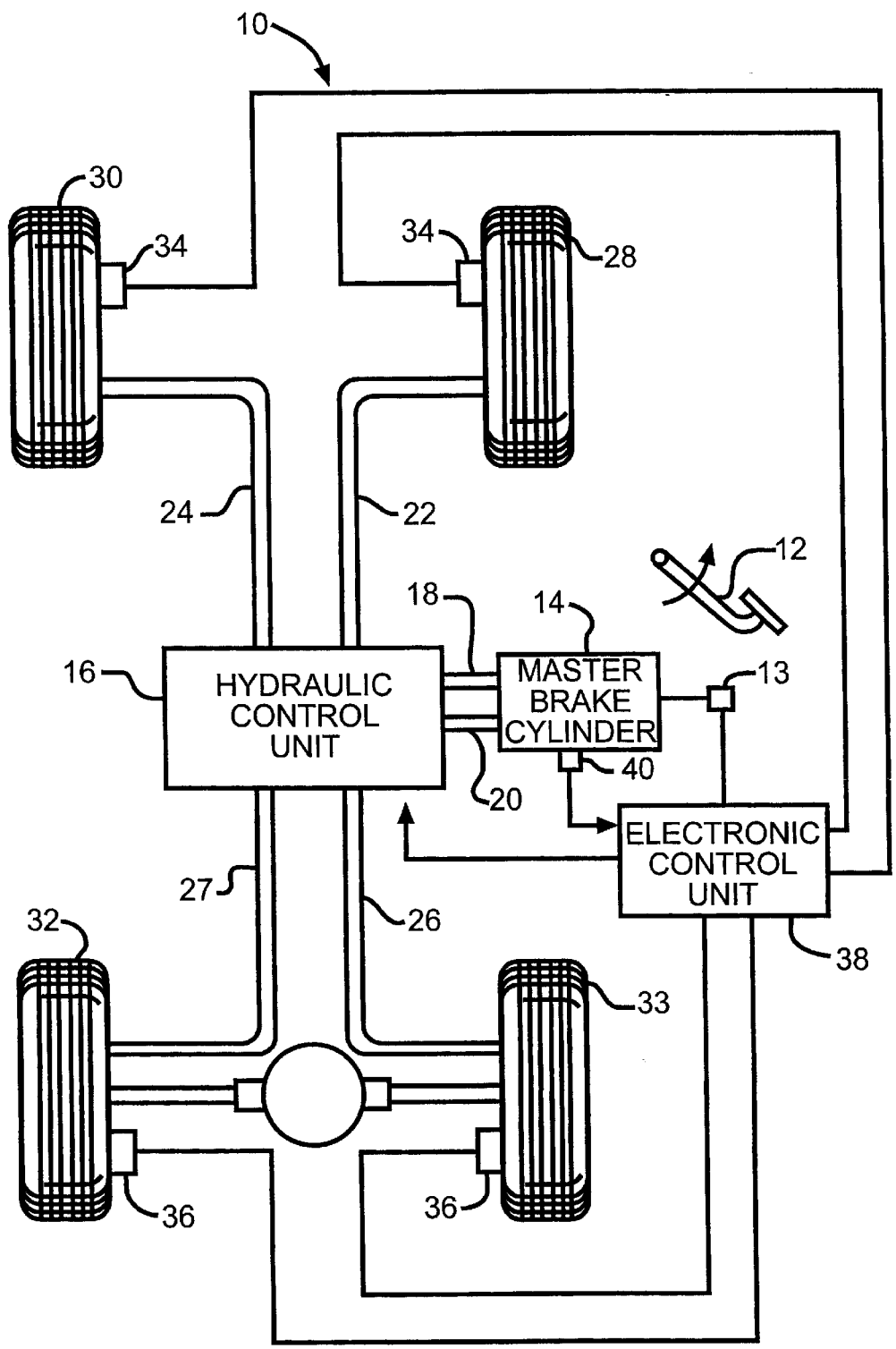
FIG. 2 is a schematic diagram of a brake control system in accordance with the prior art that includes Hydraulic Brake Assist.
Figure 3:
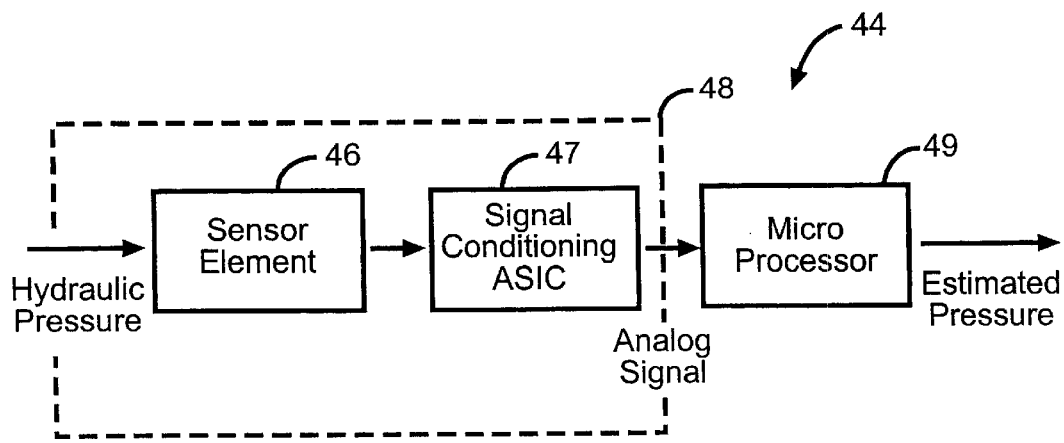
FIG. 3 is a schematic diagram of a pressure sensor that is included in the brake control system shown in FIG. 2.
Figure 4:
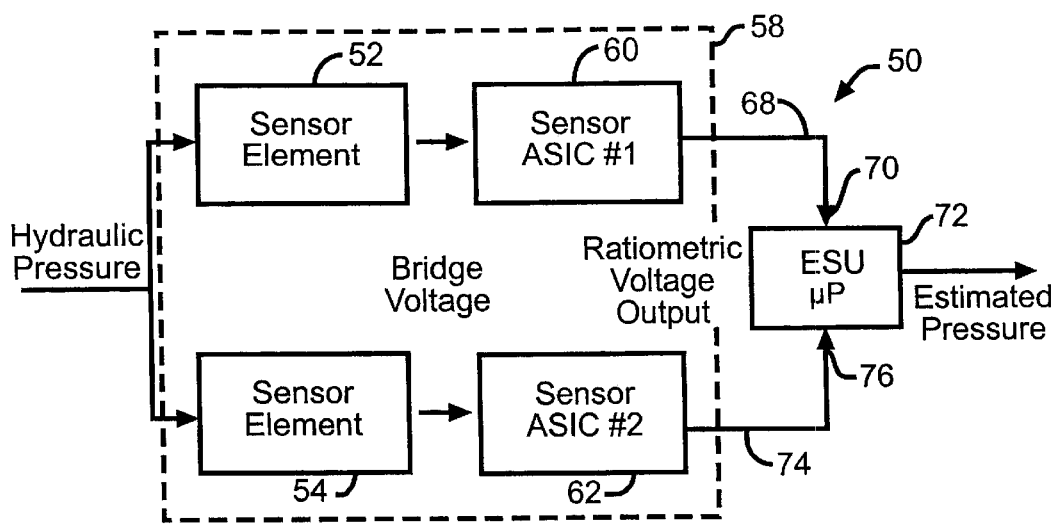
FIG. 4 is a schematic diagram of a pressure sensor for the brake control system shown in FIG. 2 that is in accordance with the present invention.
Figure 5:
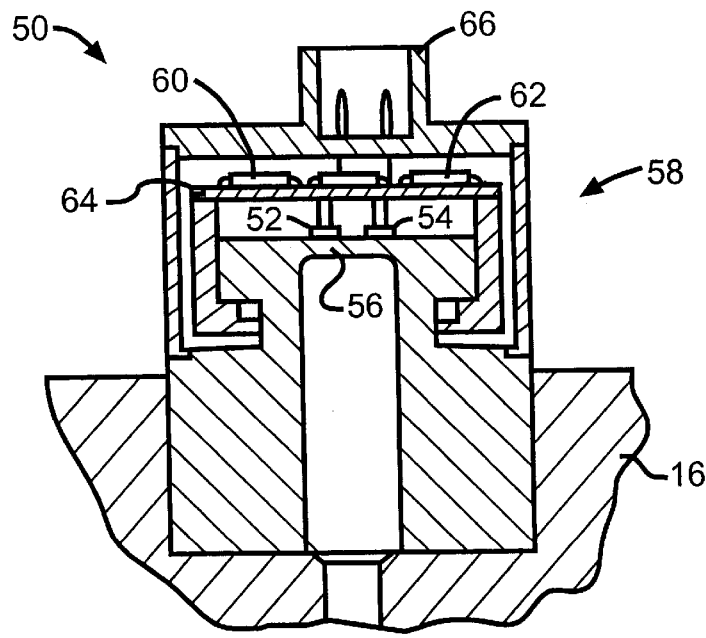
FIG. 5 is a sectional view of the pressure sensor shown in FIG. 4.

Referring once more to the drawings, there is shown at 50 in FIG. 4, a schematic diagram for an improved pressure sensor that increases HBA system reliability by providing redundancy in a single pressure sensor assembly. As best seen in FIG. 5, the present invention contemplates placing two separate conventional sensor elements 52 and 54 upon a single thin diaphragm 56 within a single pressure sensor housing 58. It will be appreciated that the pressure sensor structure shown in FIG. 5 is meant to be exemplary. The pressure sensor also can be configured differently than shown in FIG. 5, such as, for example, pressure sensor elements can be glued to a surface of a cavity that is then filled with a transfer fluid (not shown). A thin diaphragm would separate the transfer fluid from the brake fluid. Any change in brake fluid pressure would be transmitted through the diaphragm to the transfer fluid. Changes in transfer fluid pressure would be detected by the pressure sensor elements. However, two sets of pressure sensor elements would be included in the cavity. As also shown in FIG. 5, the pressure sensing housing 58 is mounted upon a Hydraulic Control Unit (HCU) 16; however, it will be appreciated that the pressure sensor also can be integrally mounted within the HCU 16 not shown). Each of the sensor elements 52 and 54 generates a bridge voltage that is applied to an input port of an associated sensor ASIC 60 and 62 mounted upon a Printed Circuit Board (PCB) 64.

As shown in FIG. 4, the first ASIC 60 conditions the bridge voltage generated by the associated sensor element 52 to obtain a first analog pressure output signal while the second ASIC 62 conditions the bridge voltage generated by the associated sensor element 62 to obtain a second analog pressure output signal. The first conditioned output pressure signal is supplied through an electrical connector 66 and over a first analog signal line 68 to a corresponding pressure input port 70 of an ECU microprocessor 72. Similarly, the second conditioned output pressure signal is supplied through the electrical connector 66 and over a second analog signal line 74 to a corresponding pressure input port 76 of the ECU microprocessor 72. Alternately, the ASIC's 60 and 62 can generate digital pressure output signals, in which case a digital signal line would connect the each of the ASIC's to the microprocessor 72. Additionally, in the preferred embodiment, the connector 66 includes contacts for power supply and ground connections (not shown).

The ECU microprocessor 72 compares the two output pressure signals, and, if the signals are different, determines that the sensor assembly 50 has malfunctioned. Upon determination that the sensor assembly 50 has malfunctioned, the microprocessor 72 disables the HBA and generates a warning signal for the vehicle operator. In the preferred embodiment, the warning signal consists of illuminating a light on the vehicle dashboard (not shown). The invention contemplates using one of two modes of operation for the microprocessor test comparison. In the first mode, the microprocessor 72 determines that a malfunction has occurred if the two pressure signals are not identical, that is, the difference between the two pressure signals is non-zero. Alternately, the microprocessor 72 can determine that a malfunction has occurred if the difference between the two pressure signals is greater than a predetermined threshold. As long as the difference between the pressure signals is within the allowable range, the microprocessor 72 accepts the pressure signal data as correct and generates a digital estimated pressure signal.

In the preferred embodiment, the microprocessor 72 is continually monitoring the two pressure signals while the vehicle is being operated. Thus, the pressure sensor 50 shown in FIGS. 4 and 5 provides physical redundancy by including two sensor elements, 52 and 54, two ASIC's, 60 and 62, and two analog signal transmission lines, 68 and 74.

Figure 6:
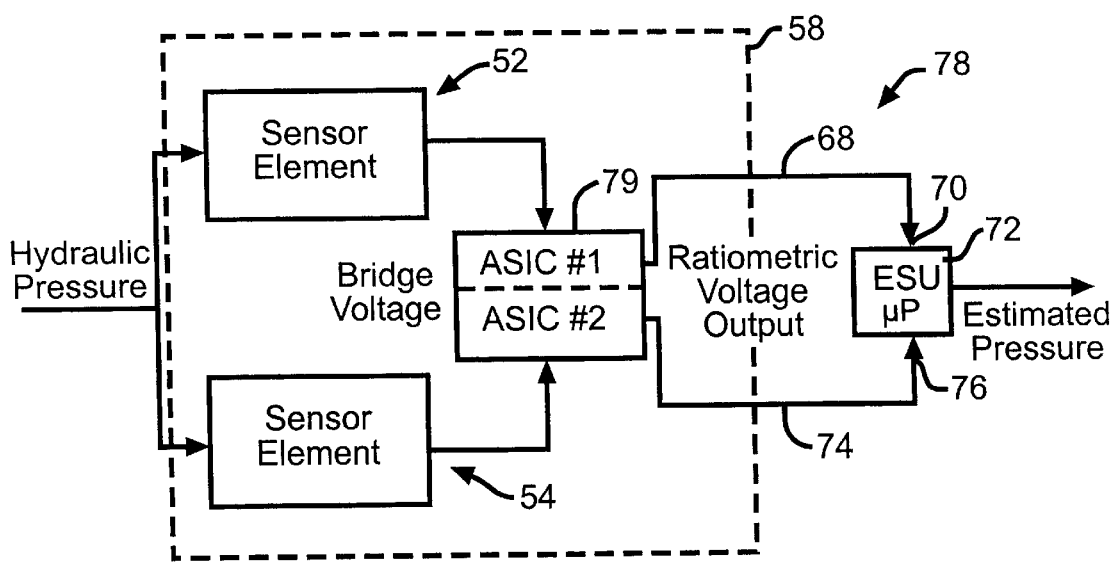
FIG. 6 is a schematic diagram of an alternate embodiment of the pressure sensor shown in FIG. 2.

The invention also contemplates an alternate structure for providing increased HBA system reliability with a single pressure sensor assembly for a HBA, as shown generally at 78 in FIG. 6. Components in FIG. 6 that are similar to components shown in FIG. 4 have the same numerical designators. Similar to the previous pressure sensor 50, the alternate structure 78 includes two pressure sensing elements 52 and 54 mounted upon a single pressure sensor diaphragm. Each of the sensor elements 52 and 54 generates a bridge voltage that is applied to a corresponding input port of a single chip 79 mounted upon the Printed Circuit Board (PCB) 64 (not shown). The chip 79 is formed to include two separate ASIC portions, that are labeled ASCI #1 and ASCI #2 in FIG. 6. Each of the ASIC portions conditions the bridge voltage of one of the sensor elements 52 and 54 to obtain two analog pressure output signals. As described above, the two conditioned output pressure signals are supplied through an electrical connector 66 over two analog lines 68 and 74 to two corresponding pressure input ports 70 and 76 of the ECU microprocessor 72. By combining the two ASIC's into a single chip, the number of components is reduced while the redundancy of the sensor elements 42 and 54 and transmission lines 68 and 74 is maintained. As described above, the microprocessor 72 compares the two analog pressure signals to determine if the pressure sensor is functioning properly.

Figure 7:
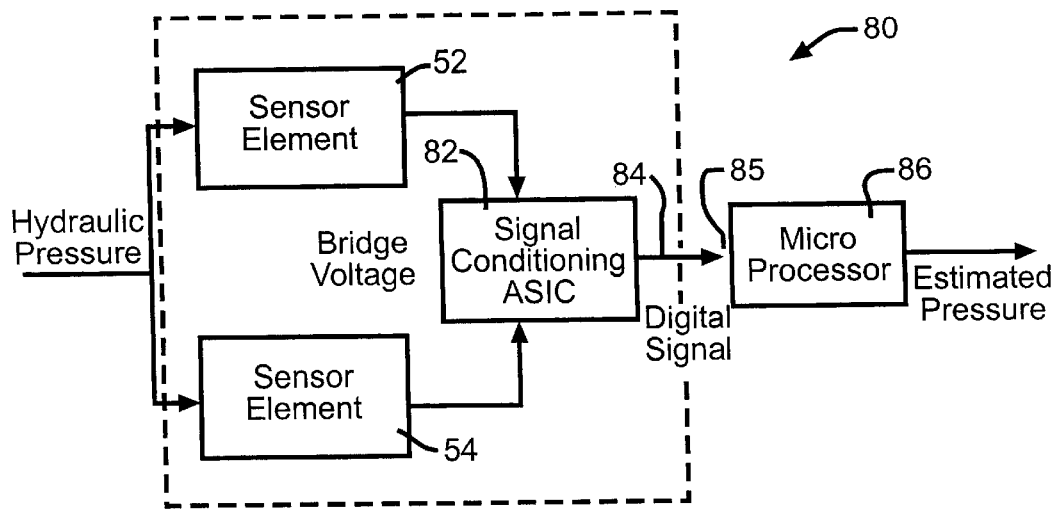
FIG. 7 is a schematic diagram of another alternate embodiment of the pressure sensor shown in FIG. 2.

The invention also contemplates a second alternate structure for providing increased HBA system reliability with a single pressure sensor assembly for a HBA, as shown generally at 80 in FIG. 7. Components in FIG. 7 that are similar to components shown in FIG. 4 have the same numerical designators. Similar to the previously described system 50, the alternate system 80 includes two pressure sensing elements 52 and 54 mounted upon a single pressure sensor diaphragm. However, the bridge voltages generated by the two sensing elements 52 and 54 are applied to input ports of a single signal conditioning ASIC 82. The ASIC 82 digitizes and conditions the bridge voltages. The digitized pressure signals are combined into a time-multiplexed signal and transmitted over a single transmission line 84 to a single pressure input port 85 of an ECU microprocessor 86.

Figure 8:
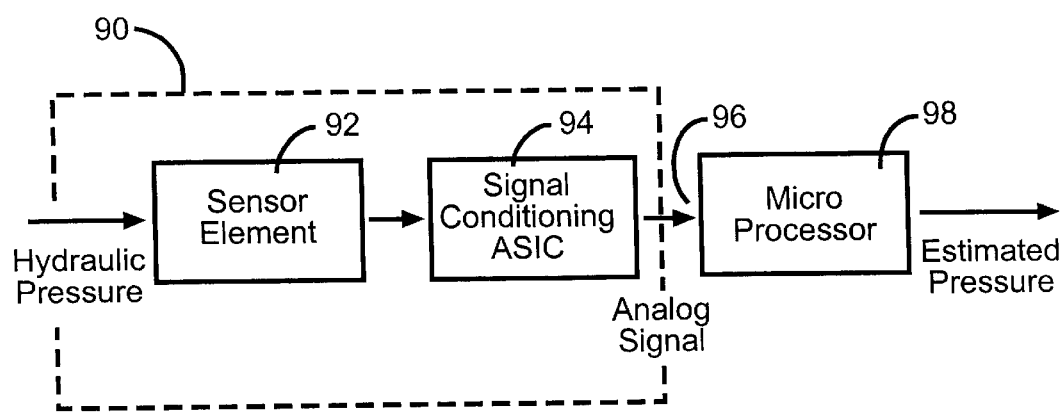
FIG. 8 is a schematic diagram of another alternate embodiment of the pressure sensor shown in FIG. 2.

The microprocessor 86 compares the pressure signals and if the difference between the signals is greater than a predetermined threshold, the microprocessor 86 generates an error signal and disables the HBA. Upon the HBA being disabled, a HBA failure indicator is illuminated to warn the vehicle operator. In the preferred embodiment, the pressure signals are transmitted every 3 milliseconds; however, other transmission time periods may be used. Additionally, the invention contemplates that the brake fluid temperature is also sensed and transmitted to the microprocessor 86; however, the temperature sensing is optional. The use of a time-multiplexed signal allows a two-wire connection between the sensor and the microprocessor 86 with current switching similar to an active wheel sensor. In the preferred embodiment, the pressure sensor 80 is compatible with a 100K baud universal asynchronous receiver/transmitter line. Furthermore, as an option, the ASCI 82 can be programmed to periodically send manufacturer's calibration data and serial number to the ECU. This is contemplated as being done less frequently than the pressure and temperature data transmittal, such as, for example at one second intervals. The invention further contemplates a third alternate structure for providing increased HBA system reliability in a single pressure sensor assembly for a HBA, as shown generally at 90 in FIG. 8. The pressure sensor 90 has a single pressure sensor element 92 and a single sensor signal conditioning ASIC 94. The ASIC 94 generates an analog pressure signal that is applied to a single pressure input port 96 of an ECU microprocessor 98. The ASIC 94 is programmed to apply diagnostic tests itself and to the bridge voltage generated by the sensor 90. Upon detecting an improper operating condition, the sensor ASIC 94 will generate an error signal to cause the ECU microprocessor 98 to disable the HBA. Additionally, the ECU microprocessor 98 continuously applies diagnostic tests to the pressure signal received from the sensor ASIC 94. Upon detecting a signal which is outside of an allowable operating range, the microprocessor 98 generates an error signal and disables the HBA. Upon disabling the HBA, the microprocessor 98 also illuminates a warning light to inform the vehicle operator of the problem.

A typical diagnostic tests will be described next. In the preferred embodiment, a regulated voltage supply supplies power to the pressure sensor and the bridge circuit output voltage is within the range that is greater than zero but less than the supply voltage. Thus, one of the diagnostic tests can include continuously monitoring the bridge output voltage to determine if the bridge output voltage is outside of the expected voltage range. For example, a determination that the bridge voltage is zero is an indication of a possible short circuit in the bridge while a voltage that is equal to the supply voltage is an indication of a possible open circuit in the bridge circuit. Upon encountering one of these conditions, the ASIC 94 would generate an error signal. The microprocessor 98 would be responsive to the error signal to disable the HBA.

The invention also contemplates that the diagnostic tests could determine in range failures, that is failures that could occur with the bridge output voltage remaining within the allowable bridge output voltage range. Thus, if the diagnostics detect an output voltage reading indicating an increased pressure that has an unusually long duration, the diagnostic tests determine that the sensor assembly 90 has failed and the HBA is disabled. Accordingly, the ASIC 94 would generate an error signal.

The present invention also contemplates that diagnostic tests can be included in the ECU microprocessor 98. It is further contemplated that the microprocessor 98 can set different fault flags to aid a technician in determining the specific cause of the fault. The tests also can correlate with external conditions, such as, for example, whether or not the vehicle brakes are applied. Thus, an increased pressure reading that occurs without the vehicle brakes being applied is an indication that the sensor 90 has probably failed.

It will be appreciated that the above described diagnostic tests are intended to be exemplary and that the invention also can be practiced with other specific diagnostic tests. The replacement of two complete pressure sensors with one allows a corresponding reduction of the overall size of the hydraulic control unit. Furthermore, with the continuing miniaturization and reduction of costs for the associated ASCI's, it is expected that the present invention will also result in reduced costs manufacturing costs for the HBA system. The inventors believe that sufficient tests can be developed to assure that the level of reliability required for single sensor 90 to be utilized in a HBA can be achieved.

Figure 9:
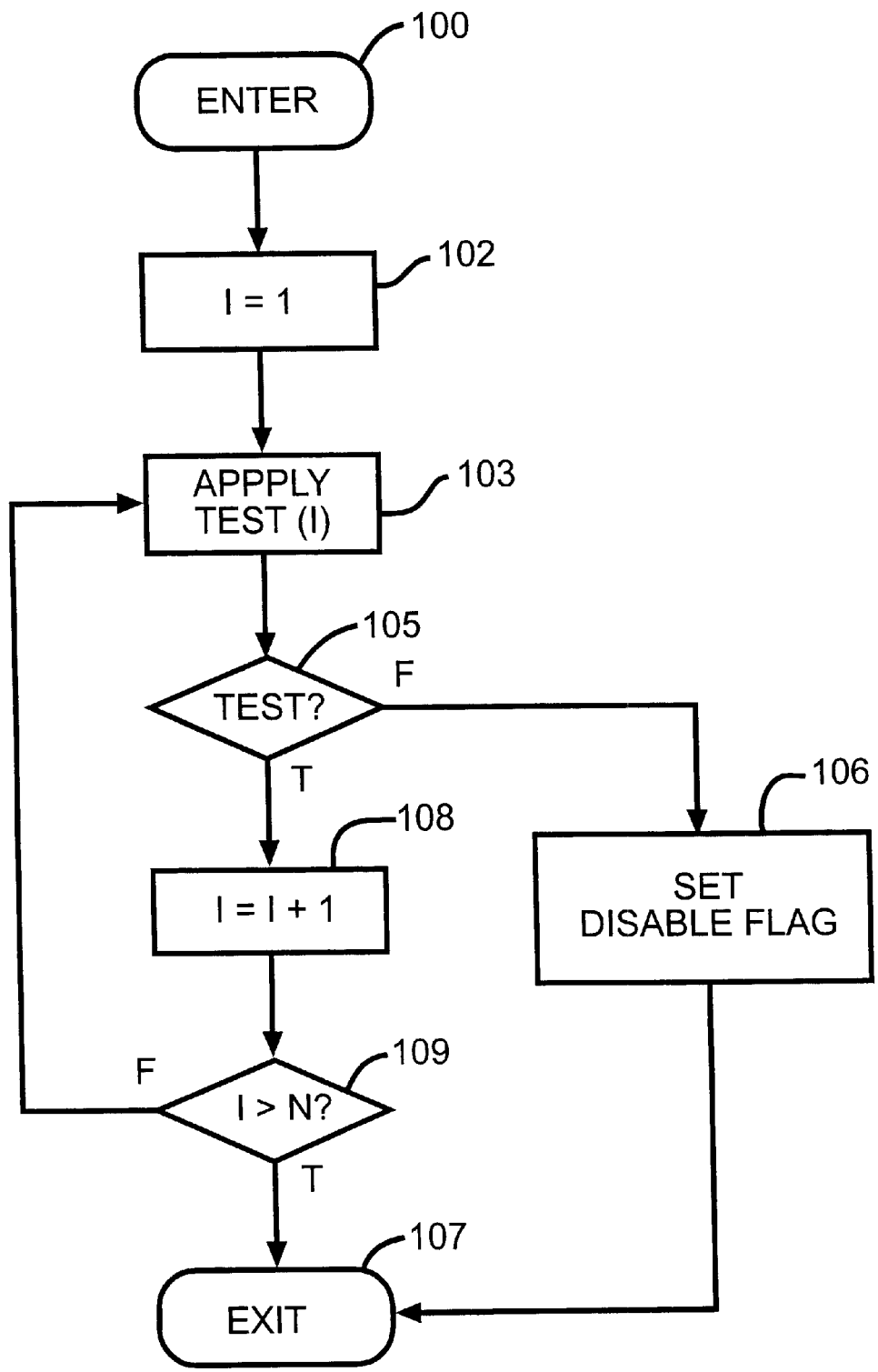
FIG. 9 is a flow chart for an algorithm for the operation of the pressure sensor illustrated in FIG. 8.

A flow chart for a testing algorithm that includes N diagnostic tests is illustrated in FIG. 9. It is contemplated that the algorithm would be included as a subroutine in the ABS control algorithm. The algorithm is called periodically by the main control algorithm and entered through block 100. An index I is initialized as one in functional block 102. In functional block 104, diagnostic test (I) is performed. For example, the current output voltage of the sensor bridge circuit is measured. The results of diagnostic test (I) are compared to the test criteria in decision block 104. For example, is the bridge output voltage equal to zero? If the test criteria is not met, that is, there is a FALSE finding, the subroutine transfers to functional block 106 where a disable flag is set and then exits back to the main control algorithm through block 107. If the test criteria is met in decision block 105, that is, there is a TRUE finding, the subroutine transfers to functional block 108 where the value of I is indexed by one, The new value of I is compared to the total number of diagnostic tests, N, in decision block 109. If I is less than or equal to N, all N tests have not been performed and the subroutine returns to functional block 103 to apply the next diagnostic test, such as, for example, is the bridge output voltage equal to the regulated supply voltage. If I is greater than N in decision block 109, all tests have been run and the subroutine exits back to the main control algorithm through block 107. As described above, the test criteria can include parameters determined from other vehicle components, such as, for example, are the vehicle brakes applied? Thus, an alternate embodiment of the algorithm shown in FIG. 9 would include sampling the other vehicle parameters (not shown).

While the preferred embodiment of the invention has been illustrated and described with a pressure sensor that included ASIC's, it will be appreciated that the invention also can be practiced with the ASIC's mounted externally from the pressure sensor. For example, the ASIC's could be included in the ECU. Similarly, while the preferred embodiment has been illustrated and described as utilizing an ECU microprocessor to compare pressure sensor data, it will be appreciated that other electrical components can be utilized to compare the signals. For example, the invention also can be practiced with an active electronic device, such as, for example, a comparator circuit, substituted for the microprocessor. Furthermore, the active electronic device or the microprocessor also could be included within the pressure sensor housing in lieu of being included in the ECU. Additionally, while the preferred embodiment of the invention has been illustrated and described as being included in an ABS, it will be appreciated that the invention also can be practice with Traction Control (TC) and/or Vehicle Stability Control (VSC) systems.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A pressure sensor assembly for a hydraulic control unit comprising:

a pressure sensor housing adapted to be mounted upon a hydraulic control unit;

a pressure sensor diaphragm carried by said pressure sensor housing;

a first pressure sensing element mounted upon said pressure sensor diaphragm;

a second pressure sensing element mounted upon said pressure sensor diaphragm;

a first signal conditioning circuit connected to said first pressure sensing elements, said first signal conditioning circuit operable to generate a first pressure signal at a first output port;

a second signal conditioning circuit connected to said second pressure sensing elements, said second signal conditioning circuit operable to generate a second pressure signal at a second output port; and an electronic device connected to said output ports of said first and second signal conditioning circuits, said electronic device operative to compare said first and second pressure signals and, upon detecting a difference therebetween, to generate an error signal.

2. The pressure sensor assembly according to claim 1, wherein said electronic device subtracts said second pressure signal from said first pressure signal and generates said error signal if the resulting difference is non-zero.

3. The pressure sensor assembly according to claim 1, wherein said electronic device subtracts said second pressure signal from said first pressure signal and generates said error signal if the resulting difference is greater than a predetermined threshold.

4. The pressure sensor assembly according to claim 3 wherein said electronic device includes a comparator circuit.

5. The pressure sensor assembly according to claim 3 wherein said electronic device includes a microprocessor.

6. The pressure sensor assembly according to claim 5 wherein the assembly is included in a hydraulic brake assist system and said microprocessor is further operable to disable said hydraulic brake assist system when said resulting difference in pressure signals is greater than said predetermined threshold.

7. The pressure sensor assembly according to claim 1 wherein said first and second signal conditioning circuits are included in a single electronic component.

8. The pressure sensor assembly according to claim 7 wherein said electronic component includes an application specific integrated circuit.

9. A pressure sensor assembly for a hydraulic control unit comprising:

a pressure sensor housing adapted to be mounted upon a hydraulic control unit;

a pressure sensor diaphragm carried by said pressure sensor housing;

two pressure sensing elements mounted upon said pressure sensor diaphragm;

a single signal conditioning circuit connected to both of said pressure sensing elements, said signal conditioning circuit operable to generate a digital pressure signal which includes pressure data from both of said pressure sensing elements; and an electronic device connected to an output port of said signal conditioning circuit, said microprocessor operative to compare said pressure data and, upon detecting a difference therebetween, to generate an error signal.

10. The pressure sensor assembly according to claim 9, wherein said digital pressure signal is time multiplexed.

11. The pressure sensor assembly according to claim 10, wherein said electronic device subtracts said second pressure signal data from said first pressure signal data and generates said error signal if the resulting difference is non-zero.

12. The pressure sensor assembly according to claim 10, wherein said electronic device subtracts said second pressure signal data from said first pressure signal data and generates said error signal if the resulting difference is greater than a predetermined threshold.

13. The pressure sensor assembly according to claim 12 wherein said electronic device includes a comparator circuit.

14. The pressure sensor assembly according to claim 12 wherein said electronic device includes a microprocessor.

15. The pressure sensor assembly according to claim 14 further including a temperature sensor and wherein said digital signal generated by said signal conditioning circuit includes temperature data.

16. The pressure sensor assembly according to claim 14 wherein the assembly is included in a hydraulic brake assist system and said microprocessor is further operable to disable said hydraulic brake assist system when said resulting difference in pressure signal data is greater than said predetermined threshold.

17. A pressure sensor assembly for a hydraulic control unit comprising:

a pressure sensor housing adapted to be mounted upon a hydraulic control unit;

a pressure sensor diaphragm carried by said pressure sensor housing;

a single pressure sensing element mounted upon said pressure sensor diaphragm;

a signal conditioning circuit connected to said pressure sensing element, said signal conditioning circuit operative to generate a pressure signal, said signal conditioning circuit also including at least one diagnostic test and operable to generate an error signal upon detecting a predetermined fault condition; and an electronic device connected to output port of said signal conditioning circuit.

18. The pressure sensor assembly according to claim 17 wherein said electronic device includes a comparator circuit.

19. The pressure sensor assembly according to claim 17 wherein said electronic device includes a microprocessor.

20. The pressure sensor assembly according to claim 19 wherein said microprocessor also includes at least one diagnostic test and is operative to generate an error signal upon detection of a predetermined fault condition.

21. The pressure sensor assembly according to claim 20 wherein the assembly is included in a hydraulic brake assist system and said microprocessor is operable upon detection of an error signal to disable said hydraulic brake assist system.

22. The pressure sensor assembly according to claim 19 wherein said signal conditioning circuit includes a plurality of diagnostic tests and is operative to sequentially apply said diagnostic tests to detect a predetermined pressure fault condition.

23. The pressure sensor assembly according to claim 22 wherein said microprocessor includes a plurality of diagnostic tests and is operative to sequentially apply said diagnostic tests to detect a predetermined pressure sensor fault condition.

24. The pressure sensor assembly according to claim 23 wherein said microprocessor is adapted to receive operating data from at least one vehicle component, and further wherein said microprocessor is operative to include said vehicle parameter data in said diagnostic test.

* * * * *